United States Patent
Pahk et al.

(10) Patent No.: US 6,860,020 B2
(45) Date of Patent: Mar. 1, 2005

(54) ULTRA-PRECISION FEEDING APPARATUS

(76) Inventors: Heui-Jae Pahk, Na-404, Kyosu Apt., 244-2, Bongchun-dong, Kwanaku-ku, Seoul (KR), 151-050; Jong-Ho Park, Ra-303, Kookminhouse, Songjeong-dong, Icheon-si, Kyungki-do (KR), 467-040

( * ) Notice: Subject to any disclaimer, the term of this patent is extended or adjusted under 35 U.S.C. 154(b) by 0 days.

(21) Appl. No.: 10/478,715

(22) PCT Filed: Aug. 6, 2001

(86) PCT No.: PCT/KR01/01339
§ 371 (c)(1),
(2), (4) Date: Nov. 24, 2003

(87) PCT Pub. No.: WO02/100591
PCT Pub. Date: Dec. 19, 2002

(65) Prior Publication Data
US 2004/0149067 A1 Aug. 5, 2004

(30) Foreign Application Priority Data
May 25, 2001 (KR) ......................................... 2001-28892

(51) Int. Cl.⁷ .............................. B23Q 1/25; G01B 5/00
(52) U.S. Cl. ........................... 33/1 M; 33/549; 248/913
(58) Field of Search .......................... 33/1 M, 503, 549, 33/556, 573; 248/660, 661, 913; 269/71, 73

(56) References Cited

U.S. PATENT DOCUMENTS

| | | | |
|---|---|---|---|
| 4,610,442 A | | 9/1986 | Oku et al. |
| 5,836,080 A | * | 11/1998 | Inagaki et al. ............... 33/1 M |
| 5,984,501 A | | 11/1999 | Tomotaki et al. |
| 6,434,845 B1 | * | 8/2002 | Pereira et al. ................ 33/503 |
| 6,453,566 B1 | * | 9/2002 | Bottinelli et al. ............ 33/1 M |
| 2002/0020069 A1 | * | 2/2002 | Bottinelli et al. ............ 33/1 M |
| 2003/0213135 A1 | * | 11/2003 | Kaneko et al. ............... 33/1 M |
| 2004/0163450 A1 | * | 8/2004 | Gweon et al. ................. 269/71 |

* cited by examiner

Primary Examiner—G. Bradley Bennett
(74) Attorney, Agent, or Firm—Lowe Hauptman Gilman & Berner, LLP (57) ABSTRACT

Provided is an ultra-precision feeding apparatus. The feeding apparatus comprises an actuator horizontally positioned between a base and a motion stage movably provided to the top of the base, first hinge member which is fixed to the base and one end of the actuator, second hinge member which is fixed to the other end of the actuator, third hinge member with two hinges which is fixed to the motion stage, and a lever member with a notch hinge which is fixed to the base and cooperates with the second hinge member and the third hinge member.

5 Claims, 7 Drawing Sheets

ULTRA-PRECISION FEEDING APPARATUS

TECHNICAL FIELD

The present invention relates to an ultra-precision feeding apparatus, and more particularly, to an ultra-precision feeding apparatus capable of precisely performing a fine motion of the submicron order.

BACKGROUND ART

As well known, the importance of ultra-precision positioning technology has gradually increased in a variety of industrial fields. In particular, the development of semiconductor technology results in high integration of circuits. Consequently, a line width for use in the latest microprocessor is in the order of 0.18 $\mu$m which is $\frac{1}{500}$ times as large as the diameter of a hair. In such a case, the accuracy required for a wafer manufacturing stage should meet reproducibility requirements of 20 nm that is $\frac{1}{10}$ times as large as the line width. Further, an ultra precision feeding apparatus implemented in the submicron order can be utilized in ultra-precision measurement fields, such as an atomic force microscope (AFM) and a scanning electron microscope (SEM), and in industrial fields including the information industry, and thus, it has a wide range of application.

A general positioning apparatus using a linear motor, or a servomotor and a ball screw has a relatively long stroke. However, it has a limitation on implementable positional accuracy due to a structural limitation such as backlash. The general positioning apparatus also has a disadvantage in that the height of the entire system is increased since an actuator is arranged vertically to obtain a vertical motion. This leads to many difficulties in controlling a vertical position in works requiring high accuracy.

Meanwhile, the ultra-precision positioning apparatus for achieving a motion of submicron order should be designed in such a manner that there is no frictional portion to eliminate or minimize nonlinear factors. Further, in the ultra-precision positioning apparatus, the actuator itself should be constructed by a component that can be easily driven in the submicron order and has high repeatability. Moreover, it is necessary to design the ultra-precision positioning apparatus so that its height can be kept as low as possible.

DISCLOSURE OF INVENTION

The present invention is conceived to solve the aforementioned problems in the prior art. An object of the present invention is to provide an ultra-precision feeding apparatus capable of precisely performing a fine motion of the submicron order.

Another object of the present invention is to provide an ultra-precision feeding apparatus capable of making the entire height thereof very low and enhancing the stiffness of a motion stage itself.

A further object of the present invention is to provide an ultra-precision feeding apparatus capable of maintaining very high repeatability and performing a continuous and smooth fine motion.

In order to achieve the above objects, an ultra-precision feeding apparatus according to the present invention comprises an actuator horizontally positioned between a base and a motion stage movably provided above a top of the base, a first hinge member with a circular hinge, the first hinge member being fixed to the base and one end of the actuator, a second hinge member with a circular hinge, the second hinge member being fixed to the other end of the actuator, a third hinge member with first and second hinges, the third hinge member being fixed to the motion stage, and a lever member with a notch hinge, the lever member being fixed to the base and cooperates with the second hinge member and the third hinge member.

BEST MODE FOR CARRYING OUT THE INVENTION

Hereinafter, a preferred embodiment of an ultra-precision feeding apparatus according to the present invention will be described in detail with reference to the accompanying drawings.

Figure 1:
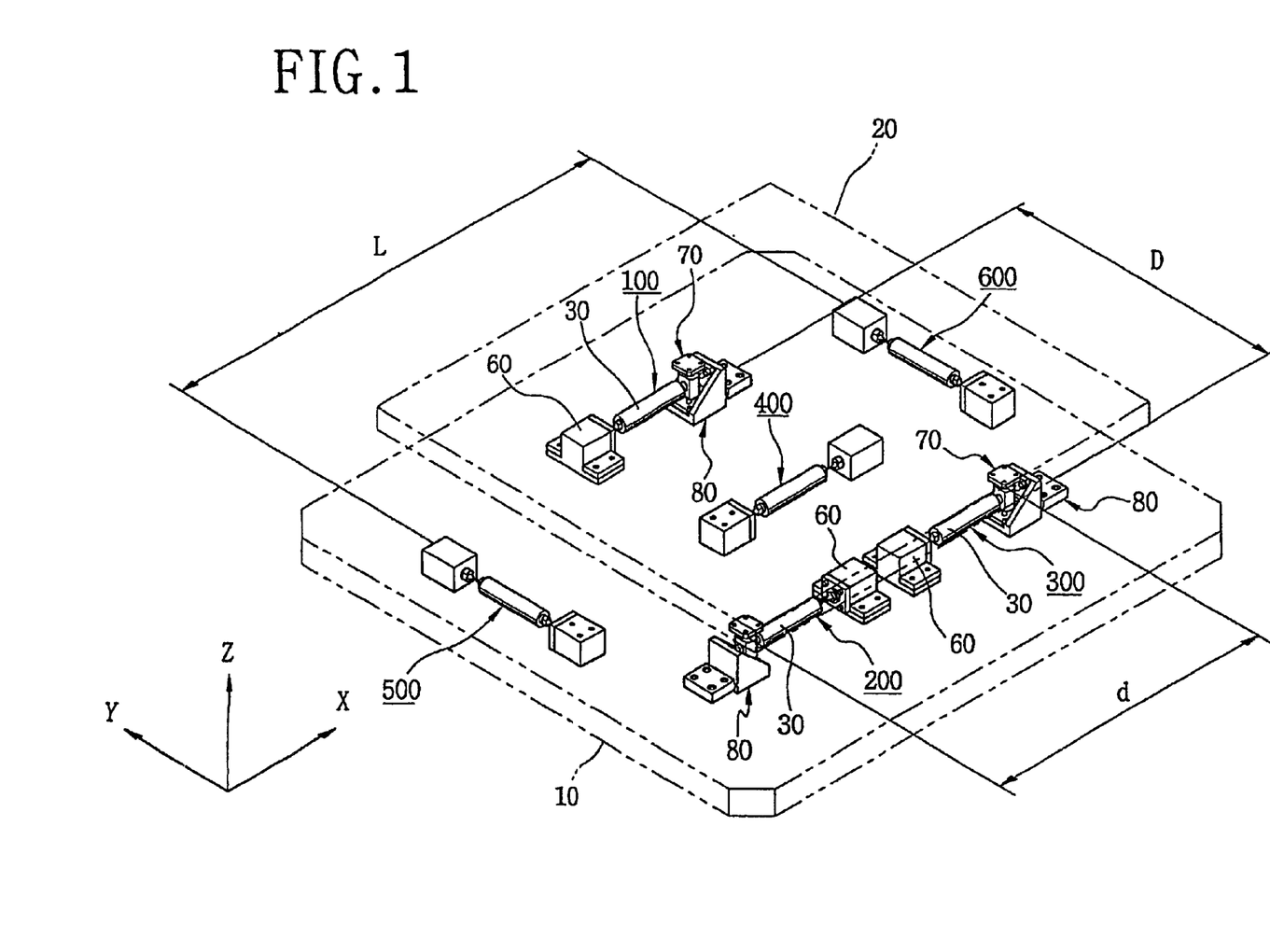
FIG. 1 is a perspective view schematically showing an example of an ultra-precision positioning system to which an ultra-precision feeding apparatus according to the present invention is applied.
Figure 2:
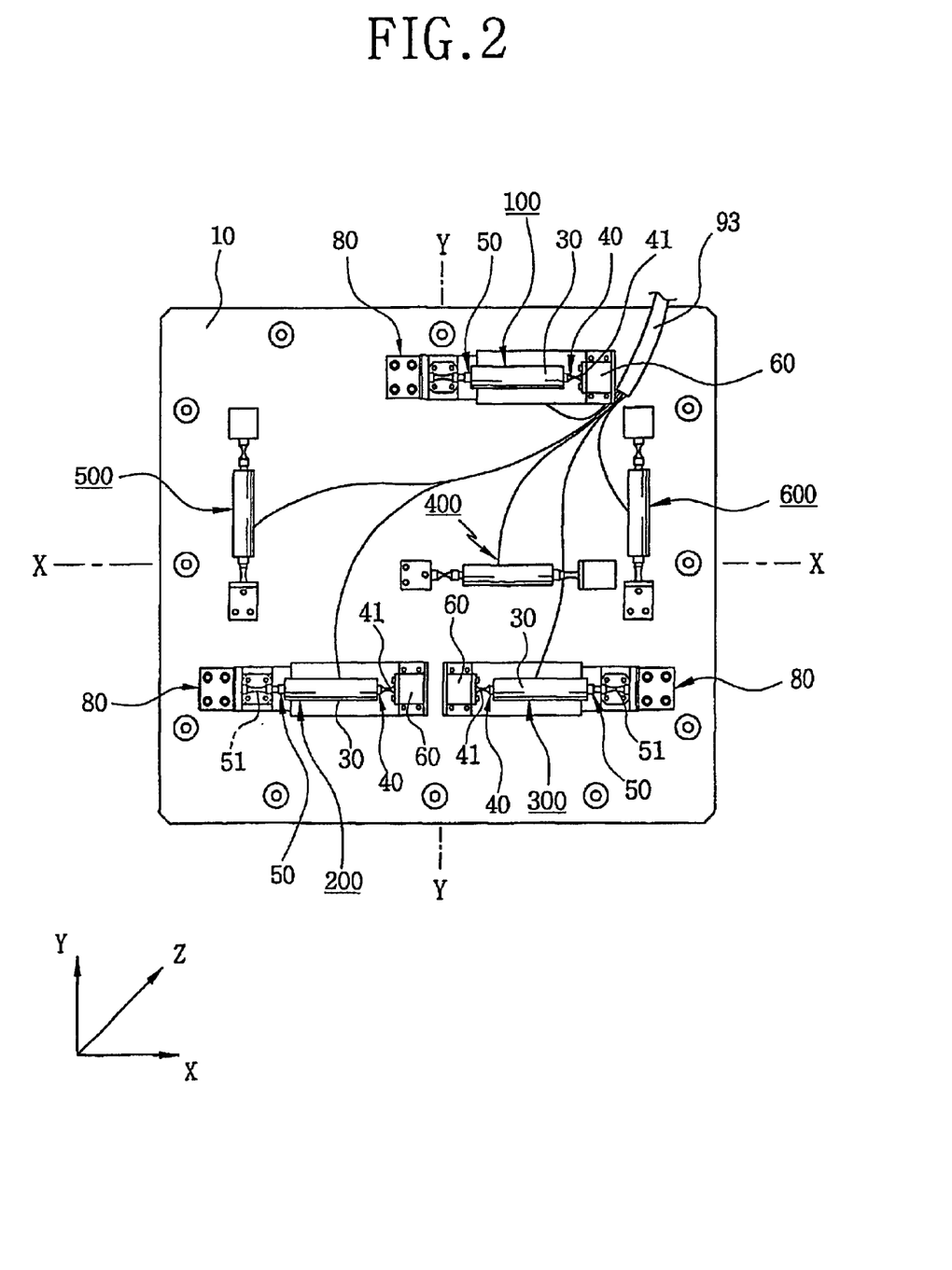
FIG. 2 is a plan view of the ultra-precision positioning system of FIG. 1 with a motion stage removed therefrom.

Referring first to FIGS. 1 and 2, an ultra-precision feeding apparatus according to the present invention is installed between a stationary base 10 and a motion stage 20 which is provided above a the top of the base 10 and movable with respect to the base 10. A piezo actuator 30 is horizontally positioned between the base 10 and the motion stage 20. Although the present embodiment utilizes the piezo actuator, it may employ a voice coil actuator or a magnetic actuator instead of the piezo actuator.

Figure 3:
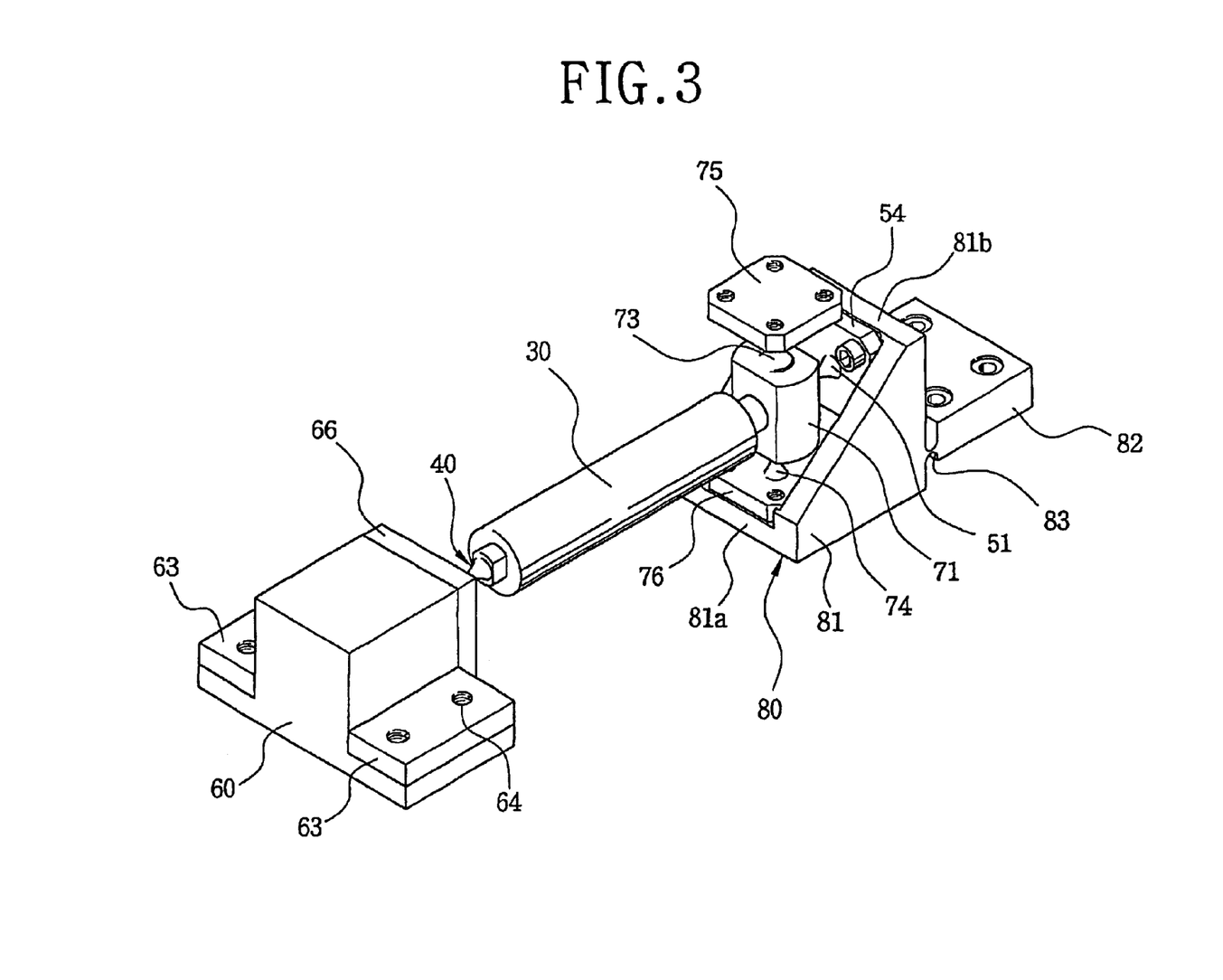
FIG. 3 is a perspective view showing the constitution of an ultra-precision feeding apparatus according to the present invention.
Figure 4:
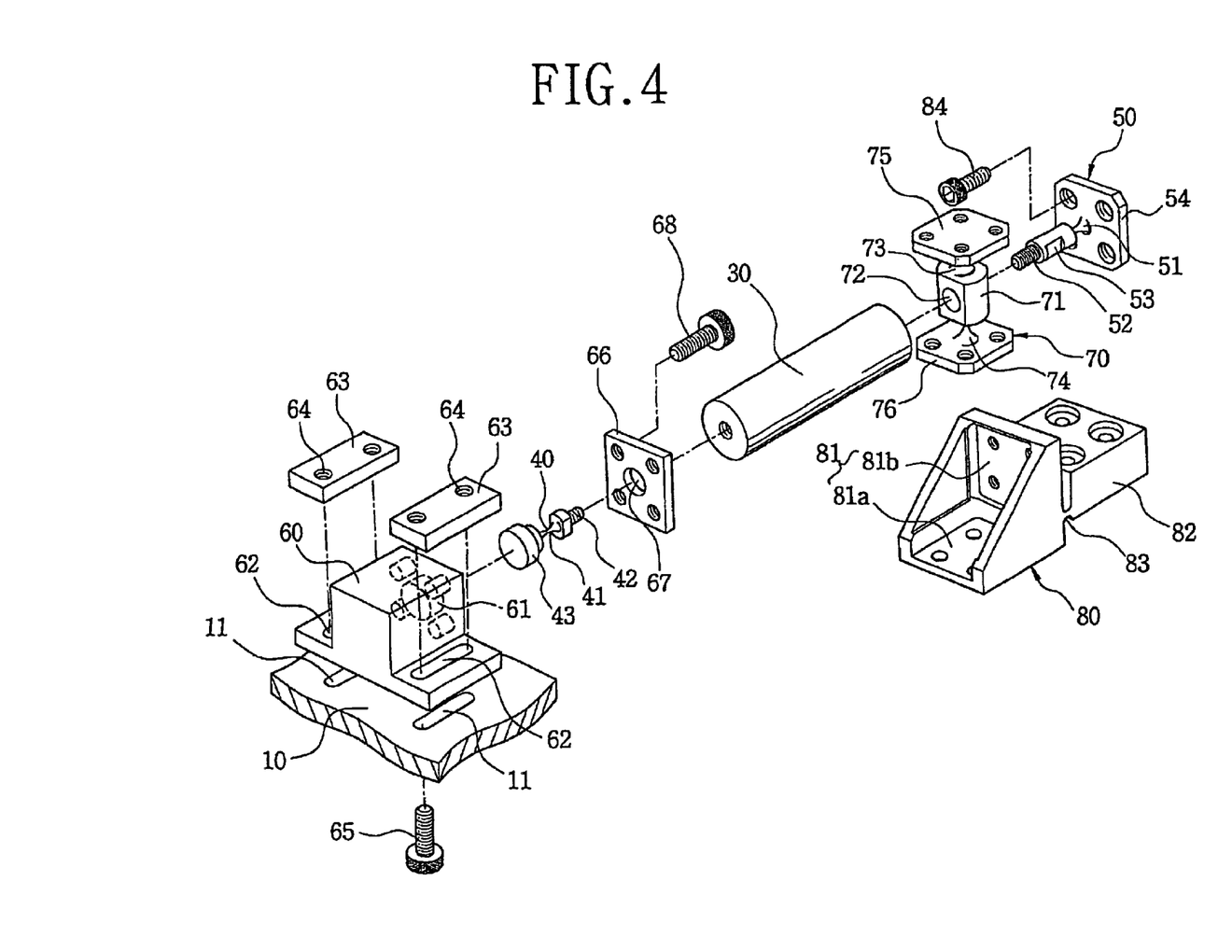
FIG. 4 is an exploded view showing the constitution of the ultra-precision feeding apparatus according to the present invention.

Referring to FIGS. 1, 3 and 4, the ultra-precision feeding apparatus according to the present invention includes a first hinge member 40 with a circular hinge 41 and a second hinge member 50 with a circular hinge 51, which are fixedly arranged to both ends of the piezo actuator 30 and constitute stage driving portions. The circular hinges 41, 51 of the first and second hinge members 40, 50 are elastic hinges which have a linear relationship between force and displacement and make a deformable motion using elastic deformation of the material itself of the hinges. Further, since the circular hinges 41, 51 have no relative motions at contact surfaces, their driving by fine displacement is made continuous and a smooth motion locus is provided. Moreover, since fracture mechanism due to fatigue or excessive force can be easily expected in brittle material, a hinge structure made of elastic-brittle material can be easily applied to a system having very high repeatability.

Threaded portions 42, 52 formed at each one end of the first and second hinge members 40, 50 are fastened to both the ends of the piezo actuator 30, respectively. A cylindrical fixing portion 43 formed at the other end of the first hinge member 40 is fitted into a hole 61 of a fixing block 60. Slots 62 are formed at both sides of the fixing block 60 to be aligned with slots 11 formed in the base 10. Pads 63 are positioned at the tops of the slots 62 of the fixing block 60, respectively. Screws 65 penetrate through the slots 11 of the base 10 and the slots 62 of the fixing block 60 and are engaged with threaded holes 64 of the pads 63. Thus, the fixing block 60 is fixedly attached to the base 10. A support plate 66 has a hole 67 formed in the center thereof to support a fixing portion 43 of the first hinge member 40 fitted into the hole 61 of the fixing block 60. The support plate 66 is fixedly attached to the fixing block 60 by means of fastening of screws 68 to prevent escape of the first hinge member 40.

Figure 7A:
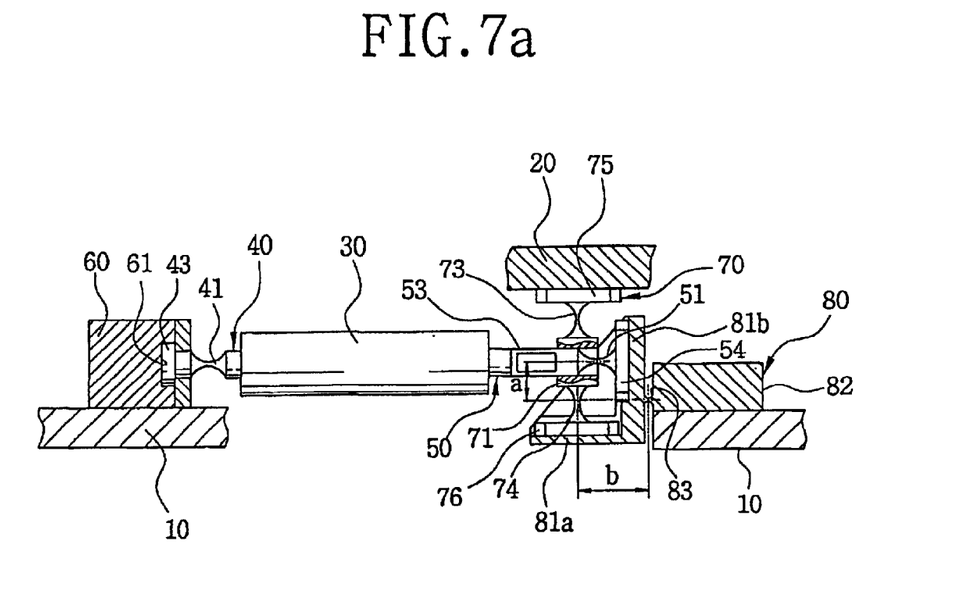
FIGS. 7a and 7b are sectional views showing an operation of the ultra-precision feeding apparatus according to the present invention.
Figure 7B:
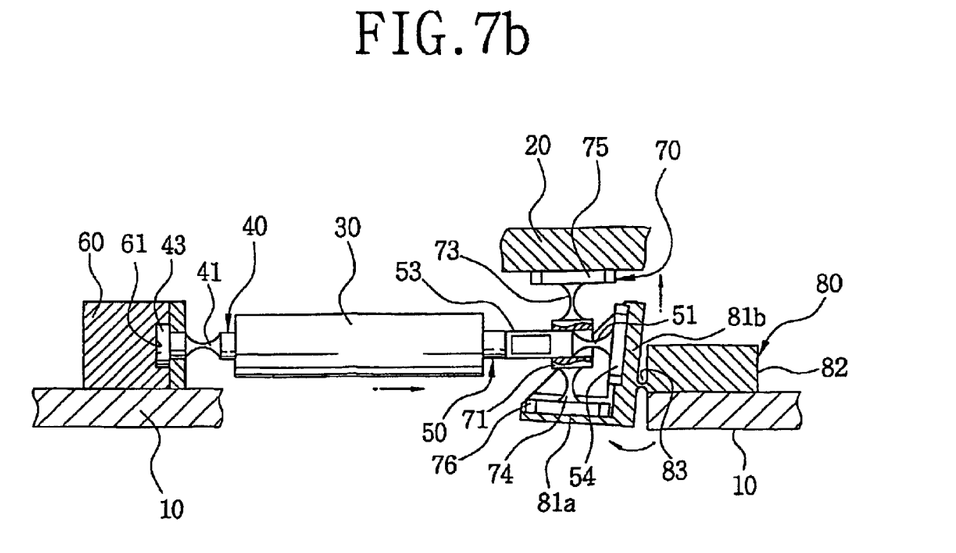

Meanwhile, a cylindrical extension 53 is formed between the cylindrical hinge 51 and the threaded portion 52 of the second hinge member 50 and a joint plate 54 is formed at the other end of the second hinge member. The extension 53 of the second hinge member 50 is fitted into a hole 72 of a body 71 of a third hinge member 70 disposed perpendicularly to the piezo actuator 30 as shown in FIGS. 7a and 7b. Upper and lower ends of the body 71 of the third hinge member 70 are formed with first and second circular hinges 73, 74, respectively. First and second joint plates 75, 76 are connected to the first and second circular hinges 73, 74, respectively. The first joint plate 75 of the third hinge member 70 is fixedly attached to the bottom of the motion stage 20 by means of fastening of screws. In the present embodiment, the second hinge member 50 is secured to the actuator 30 with the third hinge member 70 interposed therebetween. However, the second hinge member 50 may be secured to the piezo actuator 30 without interposing the third hinge member 70 therebetween.

Referring to FIGS. 3, 4, 7a and 7b, the ultra-precision feeding apparatus according to the present invention includes a lever member 80 which cooperates with the second hinge member 50 and the third hinge member 70. The lever member 80 comprises a first lever 81, a second lever 82, and a notch hinge 83 for integrally connecting the first lever 81 and the second lever 82. The first lever 81 comprises a horizontal portion 81a and a vertical portion 81b, and the second lever 82 is disposed to be perpendicular to the vertical portion 81b. The second joint plate 76 of the third hinge member 70 is fixedly attached to the horizontal portion 81a of the first lever 81 by means of fastening of screws 84, while the joint plate 54 of the second hinge member 50 is fixedly attached to the vertical portion of the first lever 81 by means of fastening of screws. The second lever 82 of the lever member 80 is fixedly attached to the top of the base 10 by means of fastening of screws.

Referring again to FIGS. 1 and 2, all of the piezo actuator 30, the first hinge member 40, the second hinge member 50, the fixing block 60, the third hinge member 70 and the lever member 80 of the ultra-precision feeding apparatus according to the present invention constitute each of first to third feeding mechanisms 100, 200 and 300 for performing a z-axis translational motion of vertically moving the motion stage 20 as well as x- and y-axis rotational motions of the motion stage with respect to the base 10. Meanwhile, the first to third feeding mechanisms 100, 200 and 300 according to the present invention cooperate with fourth and sixth feeding mechanisms 400, 500 and 600 for performing an x-axis translational motion, a y-axis translational motion and a z-axis rotational motion of the motion stage to move the motion stage 20 in six degrees of freedom with respect to the base 10.

The fourth feeding mechanism 400 performs the x-axis translational motion of the motion stage 20 with respect to the base 10, as shown in FIG. 1. The fifth and sixth feeding mechanisms 500, 600 cooperate with each other to perform the y-axis translational motion and the z-axis rotational motion of the motion stage 20 with respect to the base 10. Each of the fourth to sixth feeding mechanisms 400, 500 and 600 includes the piezo actuator, and the first and second hinge members with the circular hinges which are fixedly arranged to both the ends of the piezo actuator 30 to constitute the stage driving portions. Since the constitutions and operations of the piezo actuator and the first and second hinge members of the fourth to sixth feeding mechanisms 400, 500 and 600 are the same as the piezo actuator 30 and the first and second hinge members 40, 50, the detailed description thereof will be omitted.

Figure 6:
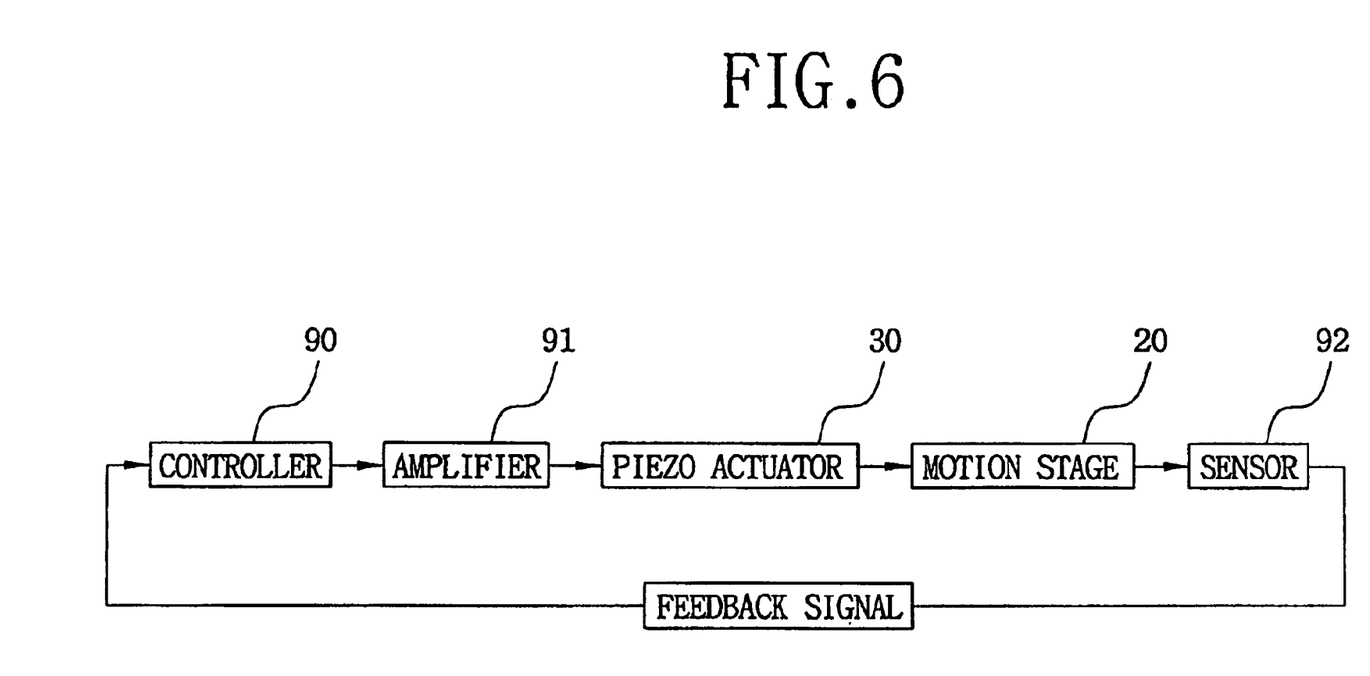
FIG. 6 is a block diagram illustrating a control means of the ultra-precision feeding apparatus according to the present invention.

FIG. 6 shows a block diagram of control of the ultra-precision feeding apparatus according to the present invention. Referring to FIG. 6, in order to perform an ultra-precision motion of the motion stage 20, the ultra-precision feeding apparatus according to the present invention comprises a controller 90 for outputting and controlling driving signals for use in drive of the piezo actuators 30, an amplifier 91 for amplifying the driving signals from the controller 90 and inputting the amplified signals into the piezo actuators 30, and a sensor 92 for detecting a motion position of the motion stage 20. In the present embodiment, the sensor 92 can include a mirror (not shown) attached to the top of the motion stage, and a laser interferometer (not shown) having a laser for scanning the mirror with a laser beam. Further, as shown in FIG. 2, the piezo actuators 30 and the controller 90 are electrically connected with one another through a cable 93.

The driving signals for the piezo actuators 30 are outputted by means of the control of the controller 90. When the signals amplified by the amplifier 91 are inputted into the piezo actuators 30, displacement is generated in each of the piezo actuators 30. The respective displacement generated from the piezo actuators 30 is transferred to the motion stage 20 through the circular hinges 41, 51, 73 and 74 so that the motion stage 20 is moved. The motion position of the motion stage 20 is detected by the sensor 92 and the controller 90 corrects the motion position of the motion stage 20 based on feedback signals inputted from the sensor 92.

In the ultra-precision feeding apparatus according to the present invention constructed as such, since the circular hinges are elastically deformed by the piezo actuators, the hinge flexure moves the motion stage while serving to limit motion directions of the motion stage or guide the motion stage in specific directions. If values of stiffness of the hinges are known, it is possible to find out a feed of the motion stage when forces are applied to the hinges by the piezo actuators. Assuming that an axial direction of the hinge is an x-axis, relationship equations between the force and the displacement can be simplified like formulas (1), (2) and (3) with respect to the x-axis and y- and z-axes that are shear directions of the x-axis. These are well-known equations obtained by Paros-Weisbord, which have been verified through many experiments.

$$\frac{\Delta x}{F_x} \approx \frac{2R^{1/2}}{Et^{3/2}} \tag{1}$$

Figure 5:
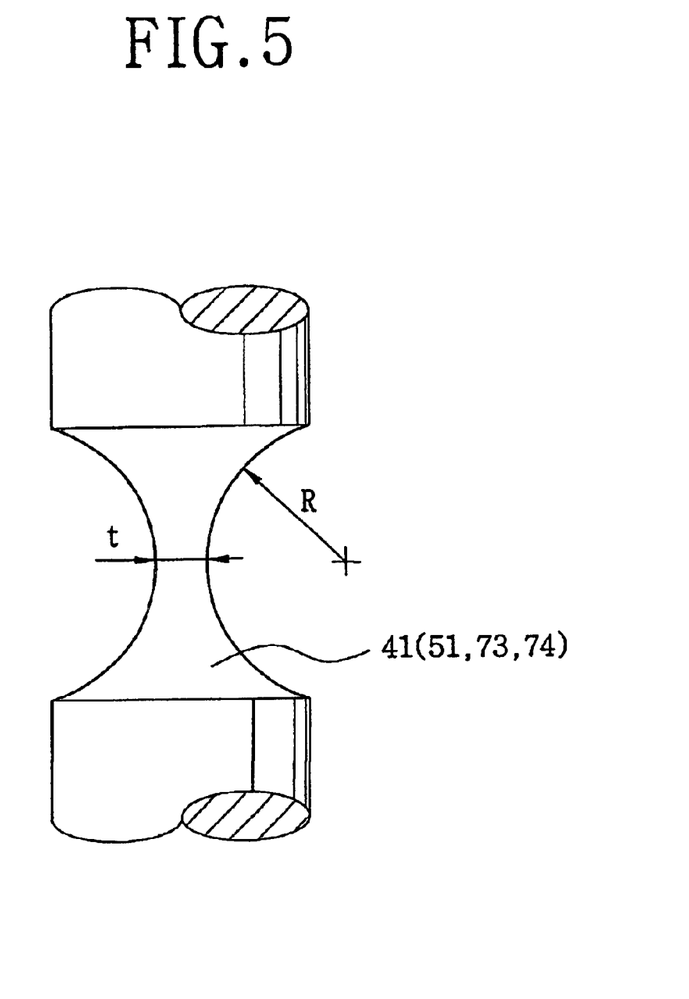
FIG. 5 is a partial front view illustrating the constitution of a circular hinge in the ultra-precision feeding apparatus according to the present invention.

-continued $$\frac{\Delta y}{F_y} = \frac{\Delta z}{F_z} \approx \frac{2R^{1/2}}{Gt^{3/2}} \quad (2)$$

$$\frac{\alpha_y}{M_y} = \frac{\alpha_z}{M_z} \approx \frac{20R^{1/2}}{Et^{7/2}} \quad (3)$$

where R and t are a radius and a thickness of the circular hinge as shown in FIG. 5, respectively, E is Young's modulus, G is a shear modulus, M is a torsional moment, and α is a rotational angle.

Since formulas (1), (2) and (3) have values within an error range of 10% as compared with results of a finite element method, they can be sufficiently accepted even though a machining tolerance of the circular hinge and hysteresis of the elastic material thereof are taken into consideration.

In the meantime, stress and strain to be generated in the hinge should be essentially taken into consideration upon design of the hinge flexure of the present invention. In the case of design of the hinge, a relationship between angular displacement and maximum stress $\sigma_{max}$ of the hinge is expressed as the following formula:

$$\theta = \frac{4K}{K_t} \frac{R}{Et} \sigma_{max} \quad (4)$$

Linear displacement can be obtained from the following formula:

$$K_t = \frac{2.7t + 5.4R}{8R+t} + 0.325 \quad (5)$$

$$\delta = L \cdot \theta$$

where θ is the angular displacement, K is a proportional constant, $K_t$ is a constant defined by formula (5), δ is feeding displacement, and L is an effective length of the hinge. Therefore, the maximum stress $\sigma_{max}$ and the Young's modulus E can be known by selecting material suitable for obtainment of desired displacement, and the radius R and thickness t of the hinge can be appropriately determined through repetitive calculations of formulas (4) and (5). The radius R and thickness t determined in such a way are substituted into formulas (1), (2) and (3) to determine the stiffness of the hinge.

In the ultra-precision feeding apparatus according to the present invention, the lever member 80 is utilized in connection with the vertical direction in order to reduce the entire height of the apparatus while enhancing the stiffness of the motion stage itself. If the vertical motion direction of the motion stage 20 is defined as the z-axis, the driving system of the ultra-precision feeding apparatus should have a structure of which height is low in the z-axis direction in order to minimize the height of the entire configuration thereof and simultaneously maximize the stiffness of the driving system. Generally, since a maximum expansion of the piezo actuator 30 is merely about 0.1% of the length thereof, the piezo actuator should be long to obtain a desired feeding range. For example, in order to obtain a feed equal to or larger than 125 μm, a piezo actuator having a length of 200 mm is required. Thus, according to the present invention, the piezo actuator 30 is horizontally positioned in consideration of the length thereof, and a horizontal motion of the piezo actuator 30 is converted into a vertical motion by the lever member 80, thereby reducing the height of the ultra-precision feeding apparatus according to the present invention.

The lever member 80 is designed such that actual vertical displacement of the motion stage 20 is made to be twice as large as the horizontal displacement of the piezo actuator 30 by adjusting a position of the notch hinge 83 which is an application point of the force transferred by the piezo actuator 30. That is, as shown in FIG. 7a, assuming that a vertical distance between an extension line of the center of the hinge 51 of the second hinge member 50 in the x-axis direction and the center of the hinge 83 of the lever member 80 is a, and a horizontal distance between an extension line of the centers of the first and second hinges 73, 74 of the third hinge member 70 in the y-axis direction and the center of the hinge 83 of the lever member 80 is b, since a central rotational angle of the hinge 83 of the lever member 80 with respect to fine displacement of the hinge 51 of the second hinge member 50 which is produced by the piezo actuator 30 is constant, the following formula is established:

$$\Delta y[=b\theta]=2\Delta x[=2a\theta]$$
$$b=2a \quad (6)$$

where θ is the rotational angle about the center of the hinge 83 of the lever member 80, Δy is the vertical displacement, and Δx is the horizontal displacement. When the horizontal displacement is produced at the joint plate 54 of the second hinge member 50 by the piezo actuator 30, the displacement is amplified at the center of the hinge 83 of the lever member 80 according to formula (6). The amplified displacement is converted into the vertical displacement by the first lever 81 of the lever member 80 and the second joint plate 76 of the third hinge member 70.

Axial stiffness $K_a$ of the stage driving portions constructed by the piezo actuators and the hinge members of the present invention can be obtained from the following formula (7), and radial stiffness $K_r$ thereof can be obtained from the following formula (8):

$$\frac{1}{K_a} = 2\frac{2R^{1/2}}{Et^{7/2}} + \frac{1}{K_{pzt}} \quad (7)$$

$$\frac{1}{K_r} = \frac{L^2}{2}\frac{20R^{1/2}}{Et^{7/2}} + \frac{2R^{1/2}}{Gt^{3/2}} \quad (8)$$

where $K_{pzt}$ is stiffness of the piezo actuator, and L is a distance between the centers of the hinges of the first and second hinge members, including the piezo actuator. The stiffness of the entire stage driving portions can be known by substituting the radius R and the thickness t into formulas (7) and (8).

Next, an operation of the ultra-precision feeding apparatus according to the present invention will be described. In the following formulas, the z-axis translational motion is expressed as Z, the x-axis rotational motion is expressed as θx, the y-axis rotational motion is expressed as θy, and the driving signals for the respective piezo actuators of the first to third feeding mechanisms 100, 200 and 300 are expressed as Z1, Z2 and Z3.

The first to third feeding mechanisms 100, 200 and 300 of the present invention implement three degrees of freedom, i.e. the z-axis translational motion, the x-axis rotational motion θx and the y-axis rotational motion θy.

If identical driving signals (Z1=Z2=Z3) are inputted into the respective piezo actuators of the first to third feeding mechanisms 100, 200 and 300 under the control of the controller 90, the z-axis translational motion of the motion stage 20 is performed as can be seen from the following formula (9):

$$Z1=Z2=Z3 \therefore Z=Z1(=Z2=Z3) \quad (9)$$

The y-axis rotational motion θy of the motion stage 20 is produced when a driving signal is not inputted into the piezo actuator of the first feeding mechanism 100 and driving signals different from each other are inputted into the respective piezo actuators of the second and third feeding mechanisms 200, 300 under the control of the controller 90. That is, if the distance between the second and third feeding mechanisms 200, 300 is defined as d (see FIG. 1), the value of the y-axis rotational motion θy can be obtained from the following formula (10):

$$θy=(Z2-Z3)/d \quad (10)$$

The x-axis rotational motion θx of the motion stage 20 is produced when identical driving signals (Z2=Z3) are inputted into the piezo actuators of the second and third feeding mechanisms 200, 300 and a different driving signal (Z1) is inputted into the piezo actuator of the first feeding mechanism 100 under the control of the controller 90. That is, if the distance between the first feeding mechanism 100 and the second or third feeding mechanism 200 or 300 is defined as D, the value of the x-axis rotational motion θx can be obtained from the following formula (11):

$$θx=(Z1-Z2)/D \quad (11)$$

The above description is merely the description of a preferred embodiment of the present invention and the scope of the present invention is not limited to the described and illustrated embodiment. Those skilled in the art can make various changes, modifications and substitutions thereto within the technical spirit and the scope of the present invention defined by the appended claims. It should be understood that such embodiments fall within the scope of the present invention.

Industrial Applicability

According to the ultra-precision feeding apparatus of the present invention mentioned above, the fine motion of the submicron order can be precisely performed by means of the piezo actuators, the hinge members with the circular hinges and the lever member with the notch hinge, the entire height thereof can be greatly reduced, and the stiffness of the motion stage itself can be enhanced. Furthermore, thanks to the hinge structure having elasticity, there is no interference wear and it is possible to maintain the very high repeatability and simultaneously perform a continuous and smooth fine motion.

What is claimed is:

1. An ultra-precision feeding apparatus, comprising:

an actuator horizontally positioned between a base and a motion stage movably provided above a top of the base;

a first hinge member with a circular hinge, the first hinge member being fixed to the base and one end of the actuator;

a second hinge member with a circular hinge, the second hinge member being fixed to the other end of the actuator;

a third hinge member with first and second circular hinges, the third hinge member being fixed to the motion stage; and a lever member with a notch hinge, the lever member being fixed to the base and cooperates with the second hinge member and the third hinge member.

2. The apparatus as claimed in claim 1, wherein the first hinge member is fixed to the base with a fixing block interposed therebetween, and the second and third hinge members are fixed to the lever member, respectively.

3. The apparatus as claimed in claim 1, wherein the second hinge member penetrates through and is then fitted into the third hinge member.

4. The apparatus as claimed in claim 2, wherein the apparatus is constructed to satisfy a following relationship equation:

$$b=2a$$

where a is a vertical distance between an extension line of a hinge center of the second hinge member in an x-axis direction and a hinge center of the lever member, and b is a horizontal distance between an extension line of centers of the first and second hinges of the third hinge member in the y-axis direction and a hinge center of the lever member.

5. The apparatus as claimed in claim 3, wherein the lever member comprises a first lever having horizontal and vertical portions to which the second and third hinge members are fixed, respectively, and a second lever which is connected to the first lever through the notch hinge and fixed to the base.

* * * * *